(12) United States Patent
Mouafik et al.

(10) Patent No.: US 11,082,878 B2
(45) Date of Patent: Aug. 3, 2021

(54) METHOD FOR MANAGING NETWORK TRAFFIC RELATED TO A MECHANISM FOR SIGNALING THE PRESENCE OF A TERMINAL

(71) Applicant: ORANGE, Issy-les-Moulineaux (FR)

(72) Inventors: Ali-Amine Mouafik, Boulogne Billancourt (FR); Antoine Mouquet, Courbevoie (FR); Sanaa El Moumouhi, Paris (FR)

(73) Assignee: ORANGE

( * ) Notice: Subject to any disclaimer, the term of this patent is extended or adjusted under 35 U.S.C. 154(b) by 228 days.

(21) Appl. No.: 15/775,262

(22) PCT Filed: Nov. 7, 2016

(86) PCT No.: PCT/FR2016/052879
§ 371 (c)(1),
(2) Date: May 10, 2018

(87) PCT Pub. No.: WO2017/081393
PCT Pub. Date: May 18, 2017

(65) Prior Publication Data
US 2020/0196181 A1 Jun. 18, 2020

(30) Foreign Application Priority Data
Nov. 10, 2015 (FR) ...................................... 1560770

(51) Int. Cl.
*H04W 28/02* (2009.01)
*H04L 29/08* (2006.01)
*H04W 64/00* (2009.01)

(52) U.S. Cl.
CPC ......... *H04W 28/0226* (2013.01); *H04L 67/24* (2013.01); *H04W 64/006* (2013.01)

(58) Field of Classification Search
None
See application file for complete search history.

(56) References Cited

U.S. PATENT DOCUMENTS

| | | | |
|---|---|---|---|
| 10,555,325 B2 * | 2/2020 | Lu | H04W 72/10 |
| 2010/0216489 A1 * | 8/2010 | Green | H04W 4/02 |
| | | | 455/456.3 |

(Continued)

OTHER PUBLICATIONS

"3rd Generation Partnership Project; Technical Specification Group Services and System Aspects; Policy and charging control architecture (Release 13)." 3GPP TS 23.203, V13.2.0. Dec. 2014.

(Continued)

*Primary Examiner* — Gregory B Sefcheck
*Assistant Examiner* — Amarnauth G Persaud
(74) *Attorney, Agent, or Firm* — David D. Brush; Westman, Champlin & Koehler, P.A.

(57) ABSTRACT

A method for managing, in a communication network, network traffic related to a mechanism for signaling the presence of a terminal in a plurality of presence-signaling areas. A mobility management entity receives, for each presence-signaling area of the plurality, an area identifier and a priority level for the area then stores, in a piece of subscriber context related to a subscriber of the terminal, the identifiers and priority levels received in association with an identifier of the terminal. When the load of the mobility management entity is higher than a predefined critical load threshold, the entity suspends the presence-signaling mechanism for the presence-signaling areas, referred to as non-monitored areas, of the plurality in which the priority level is lower than a transitional priority level.

9 Claims, 4 Drawing Sheets

(56) References Cited

U.S. PATENT DOCUMENTS

| | | | |
|---|---|---|---|
| 2010/0261473 A1* | 10/2010 | Al-Bakri | H04M 15/81 455/435.2 |
| 2013/0344887 A1* | 12/2013 | Wachter | H04W 64/00 455/456.1 |
| 2014/0349644 A1* | 11/2014 | Gomes | H04W 48/20 455/434 |
| 2015/0049648 A1* | 2/2015 | Chatras | H04L 12/1407 370/259 |
| 2015/0055475 A1* | 2/2015 | Li | H04W 28/0289 370/235 |
| 2016/0119861 A1* | 4/2016 | Jin | H04W 48/16 370/338 |
| 2016/0128116 A1* | 5/2016 | Kim | H04W 4/70 370/329 |
| 2016/0157253 A1* | 6/2016 | Yamine | H04W 4/029 455/456.2 |
| 2016/0212276 A1* | 7/2016 | Salot | H04W 4/24 |
| 2017/0064538 A1* | 3/2017 | Unger | H04W 48/18 |
| 2017/0181025 A1* | 6/2017 | Zhang | H04W 28/0226 |
| 2019/0007791 A1* | 1/2019 | Salot | H04W 4/02 |
| 2019/0222998 A1* | 7/2019 | Kim | H04W 8/08 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)." 3GPP TS 23.401, V13.1.0. Dec. 2014.

"Study on improvement of awareness of user location change (AULC)." 3GPP TSG SA Meeting #69, SP-150517. Sep. 15-17, 2015.

China Unicom et al: "Extension of Presence Reporting Area." 3GPP Draft; S2-150289 Extension of Presence Reporting Area Mechanism 23.203-CR, 3rd Generation Partnership Project (3GPP), Mobile Competence Centre; 650, Route Des Lucioles; F-06921 Sophia-Antipolis, vol. SA WG2, No. Sorrento, Italy; 20150126-20150130. Jan. 25, 2015.

International Search Report and Written Opinion dated Jan. 19, 2017 for International Application No. PCT/FR2016/052879, filed Nov. 7, 2016.

Translation of the Written Opinion dated Jan. 19, 2017 for International Application No. PCT/FR2016/052879, filed Nov. 7, 2016.

\* cited by examiner

| area | priority | status |
|------|----------|--------|
| PRA1 | p0 | active |
| PRA2 | p1 | active |
| PRA3 | p2 | active |
| PRA4 | p2 | active | figure 4a

| area | priority | status |
|------|----------|--------|
| PRA1 | p0 | active |
| PRA2 | p1 | active |
| PRA3 | p2 | inactive |
| PRA4 | p2 | inactive | figure 4b

| area | priority | status |
|------|----------|--------|
| PRA1 | p0 | active |
| PRA2 | p1 | inactive |
| PRA3 | p2 | inactive |
| PRA4 | p2 | inactive | figure 4c

| area | priority | status |
|------|----------|--------|
| PRA1 | p0 | active |
| PRA2 | p1 | inactive |
| PRA5 | p0 | active |
| PRA6 | p1 | inactive | figure 4d

| area | priority | status |
|------|----------|--------|
| PRA1 | p0 | inactive |
| PRA2 | p1 | inactive |
| PRA5 | p0 | inactive |
| PRA6 | p1 | inactive | figure 4e

| priority | notification |
|----------|--------------|
| p0 | yes |
| p1 | yes |
| p2 | no |
| p3 | no | figure 5

METHOD FOR MANAGING NETWORK TRAFFIC RELATED TO A MECHANISM FOR SIGNALING THE PRESENCE OF A TERMINAL

CROSS-REFERENCE TO RELATED APPLICATIONS

This Application is a Section 371 National Stage Application of International Application No. PCT/FR2016/052879, filed Nov. 7, 2016, the content of which is incorporated herein by reference in its entirety, and published as WO 2017/081393 on May 18, 2017, not in English.

FIELD OF THE DISCLOSURE

The invention lies within the general field of telecommunications. More particularly, it concerns a method for managing network traffic related to a mechanism for reporting the presence of a terminal in a communication network.

BACKGROUND OF THE DISCLOSURE

The specification document TS 23.203 of the 3GPP (for "3rd Generation Partnership Project") standardization group, version 13.2.0, defines an architecture called PCC (for "Policy and Charging Control" in English) architecture, for providing dynamic control of network resources on the basis of information collected by a control entity called a PCRF (for "Policy Control and Charging Rules Function" in English) entity. This information is, for example, information associated with the network (such as the type of radio access, gateway addresses, or client location), associated with a subscriber (such as subscription information), or associated with an application (such as the application type or media type). Thus the PCRF entity adapts and controls the use of network resources, notably on the basis of services required by the subscriber and his subscriber profile. For this purpose, the PCRF entity supplies a control rules application entity, called the PCEF entity, with rules for controlling a communication session between a terminal and a data packet communication network. These control rules are commonly called PCC rules.

The specification document TS 23.401 of the 3GPP standardization group, version 13.1.0, also defines a procedure for presence reporting in a presence reporting area (or PRA in English). This procedure is intended to reduce the network traffic due to a change of location of a subscriber terminal while avoiding system-wide notification of this change to various entities of the network. According to this procedure, a change of location is notified solely when the terminal enters or leaves a predefined presence reporting area consisting of one or more geographic areas. This procedure may be managed by the PCRF control entity or by a subscriber credit management entity, called the OCS (for "Online Charging System") entity.

When this procedure is managed by the PCRF control entity, the latter uses the subscriber's subscription information to determine whether the communication session to be established requires the activation of presence reporting. If this is the case, the PCRF control entity sends to the rules application entity PCEF a presence reporting area identifier associated with the subscriber, when the control rules are sent to the same entity. Thus the identifier tells the rules application entity PHR that presence reporting must be activated, or, in other words, that the PCRF control entity wishes to be notified when the terminal enters or leaves the presence reporting area associated with the subscriber.

In its initial definition, the presence reporting mechanism only allows a single presence reporting area to be associated per subscriber profile. In the document "Study on improvement of awareness of user location change", SP-150517, the standardization body 3GPP proposes that this mechanism be extended to a plurality of presence reporting areas per subscriber profile. However, this multiplication of the presence reporting areas associated with a subscriber has a number of drawbacks. It gives rise to additional reporting traffic and higher resource consumption, notably at the entity responsible for managing mobility procedures within the network (such as an MME, for "Mobility Management Entity"). This is because such an entity updates the location of a terminal and the communication session associated with this terminal whenever the latter enters or leaves one of the presence reporting areas associated with it. Such an increase in traffic is liable, in particular, to create overloading of the network, or to aggravate an existing network overload.

SUMMARY

One of the objects of the invention is to overcome deficiencies/drawbacks of the prior art and/or to make improvements thereto.

According to a first aspect, the invention relates to a method for managing, in a communication network, network traffic related to a mechanism for reporting the presence of a terminal in a plurality of presence reporting areas, comprising the following steps implemented by a mobility management entity:

receiving, for each presence reporting area of the plurality, an area identifier and a priority level for the area;

storing, in a subscriber context related to a subscriber of said terminal, identifiers and priority levels received in association with an identifier of the terminal;

and, when the load of the mobility management entity is higher than a predefined critical load threshold:

suspending the presence reporting mechanism for the presence reporting areas, referred to as non-monitored areas, of the plurality whose priority level is lower than a transitional priority level.

The management method thus enables network traffic to be lightened by assigning a priority level to each presence reporting area. More precisely, in the case of present or imminent overloading of the network, notably of the mobility management entity (such as the MME), the presence reporting mechanism implemented is suspended for the areas for which presence reporting is of lowest priority. The mobility management entity is thus relieved of the duty to handle some of the reporting messages related to the presence reporting mechanism. The mobility management entity no longer has to update the location of the terminal and the communication session associated with this terminal whenever the latter enters or leaves one of the reporting areas for which the reporting mechanism is suspended. Thus the mobility management entity may regain a load (such as the processor load) which is non-critical for the network.

Since the reporting messages related to the presence reporting mechanism sent by the mobility management entity are also relayed to entities such as a control entity (the PCRF entity, for example) or such as a subscriber credit management entity (the OCS entity, for example), the suspension of the reporting mechanism results in a lightening of the network traffic, both at the mobility management entity itself and at the network equipment required to relay the presence reporting information.

With a suitable critical load threshold, the method advantageously enables an overload of the mobility management entity, and more generally of the whole network, to be predicted before it occurs.

Furthermore, the prioritization of the presence reporting areas for a subscriber makes it possible to differentiate the quality of service offered in these areas for the same service based on the network subscriber profiles. The method makes it possible, for example, to give priority to the maintenance of a session related to a subscriber profile with which a high quality of service is associated, since the priority levels associated with the presence reporting areas for this subscriber are the highest.

According to a particular characteristic, the suspension step is reiterated until the load on the mobility management entity is below the critical load threshold, the transitional priority level being incremented on each new iteration to the priority level lying immediately above it.

The successive iterations of the step of suspending the presence reporting mechanism are particularly advantageous in the case where suspension of the mechanism for areas corresponding to a first priority level does not allow the load on the mobility management entity to be reduced below the critical load threshold. Since the transitional priority level is incremented on each iteration, the method makes it possible to increase the number of presence reporting areas affected by the suspension of the presence reporting mechanism. The network traffic due to the presence reporting mechanism is accordingly decreased.

The successive iterations of the step of suspending the presence reporting mechanism also enable the load on the mobility management entity to be progressively lightened. The method makes it possible, notably, to proceed in successive stages, by suspending the presence reporting mechanism for only a minimal number of presence reporting areas. The quality of service may therefore advantageously be maintained for a larger number of subscribers.

According to a particular characteristic, the method further comprises, when the presence reporting mechanism is suspended for all the presence reporting areas associated with the terminal, sending to the base station to which the terminal is attached a command to cancel the subscription of the base station to the presence reporting mechanism for the terminal.

When the reporting mechanism is suspended for all the presence reporting areas associated with a terminal, none of the messages received by the mobility management entity related to the presence reporting for this terminal are handled by the latter entity. The presence reporting messages sent from the base station (such as eNode B, for "evolved Node B" in an LTE, for "Long Term Evolution", network) to the mobility management entity then generate an unnecessary network load. The command to cancel the base station subscription to the reporting mechanism enables this network load to be eliminated. Since the base station is the first entity of the network capable of detecting when a terminal enters or leaves a cell, such a command also makes it possible to act directly on the source of the transmissions of presence reporting messages. When these first messages are eliminated, the traffic generated by relaying them to other entities of the network is also eliminated. Thus the method makes it possible to expedite the return to a non-critical load state, for the mobility management entity as well as for the entities of the network as a whole.

According to a particular characteristic, a notification indicator is associated with each priority level, this indicator indicating whether it is desired to send a notification to a control entity for the priority level if the reporting mechanism is suspended. The method then comprises sending to the control entity a notification of suspension of the presence reporting mechanism for the non-monitored areas having a priority level for which the indicator indicates that sending is desired.

The notifications sent to the control entity enable the latter to be informed that one or more presence reporting areas associated with a terminal is or are no longer monitored. The control entity may then take action as a result, for example on the basis of a subscriber profile associated with the terminal. It is emphasized that these notifications are used for certain priority levels only, and are therefore not sent for all the presence reporting areas for which the reporting mechanism has been suspended. By proceeding in this way, the method makes it possible to restrict the additional traffic generated by sending these notifications to the highest priority levels.

According to a particular characteristic, the notification indicator and the priority levels are supplied to the mobility management entity by the control entity.

According to a particular characteristic, the subscriber context comprises, for each presence reporting area identifier of the plurality stored, an active or suspended status, indicating whether the presence reporting mechanism is active or suspended for the presence reporting area. The method further comprises a step of updating statuses if the presence reporting areas associated with the terminal are modified, the statuses associated with the new presence reporting areas being active for the new presence reporting areas whose priority level is higher than the transitional priority level, and inactive for the new presence reporting areas whose priority level is lower than the transition priority level.

The updating of the statuses associated with the presence reporting areas enables the presence reporting mechanism to be activated and suspended in a dynamic way by the control entity. A change of subscriber profile, for example a change in the priority level of some presence reporting areas associated with a subscriber, or in the list of areas associated with a subscriber, may be directly relayed by the control entity to the mobility management entity and immediately taken into account by the latter.

According to a second aspect, the invention relates to a mobility management entity, in a communication network, capable of implementing a mechanism for reporting the presence of a terminal in a plurality of presence reporting areas, comprising:

a receiving module arranged to receive from a control entity, for each presence reporting area of the plurality, an area identifier and a priority level for the area;

a storage module arranged to store, in a subscriber context related to a subscriber of the terminal, the identifiers and priority levels received in association with an identifier of the terminal;

a verification module arranged to verify that the load on the mobility management entity is higher than a predefined critical load threshold;

a suspension module, activated when the load on the mobility management entity is verified to be higher than a predefined critical load threshold, and arranged to suspend the presence reporting mechanism for the presence reporting areas, referred to as non-monitored areas, of the plurality whose priority level is lower than a transitional priority level.

The advantages stated for any of the characteristics of the management method according to the first aspect are directly transferable to the mobility management entity according to the second aspect.

According to a third aspect, the invention relates to a control entity, in a communication network, capable of determining that a reporting of the presence of a terminal in a plurality of presence reporting areas is required for a subscriber profile of the network, the control entity comprising a sending module arranged to send to a mobility management entity, for each presence reporting area of the plurality, an area identifier and a priority level for the area.

According to a fourth aspect, the invention relates to a system for managing the network traffic related to a mechanism for reporting the presence of a terminal in a plurality of presence reporting areas of a communication network, comprising:

at least one mobility management entity; and
at least one control entity.

The advantages stated for any of the characteristics of the management method according to the first aspect are directly transferable to the management system according to the fourth aspect.

According to a fifth aspect, the invention also relates to a program for a mobility management entity, comprising program code instructions intended to command the execution of the steps of the management method described above, when said program is executed by said mobility management entity, and a recording medium, readable by a mobility management entity, on which a program for a mobility management entity is recorded.

BRIEF DESCRIPTION OF THE DRAWINGS

The invention will be more readily understood with the aid of the following description of particular embodiments, with reference to the attached drawings, in which:

FIGS. 4a, 4b, 4c, 4d and 4e show the content of a subscriber context of a terminal at different instants of a method for managing the network traffic related to a presence reporting mechanism, according to a particular embodiment;

FIG. 5 shows a correspondence table between the priority levels and the need to notify a control entity used by a mobility management entity in a particular embodiment.

DETAILED DESCRIPTION OF ILLUSTRATIVE EMBODIMENTS

Figure 1:
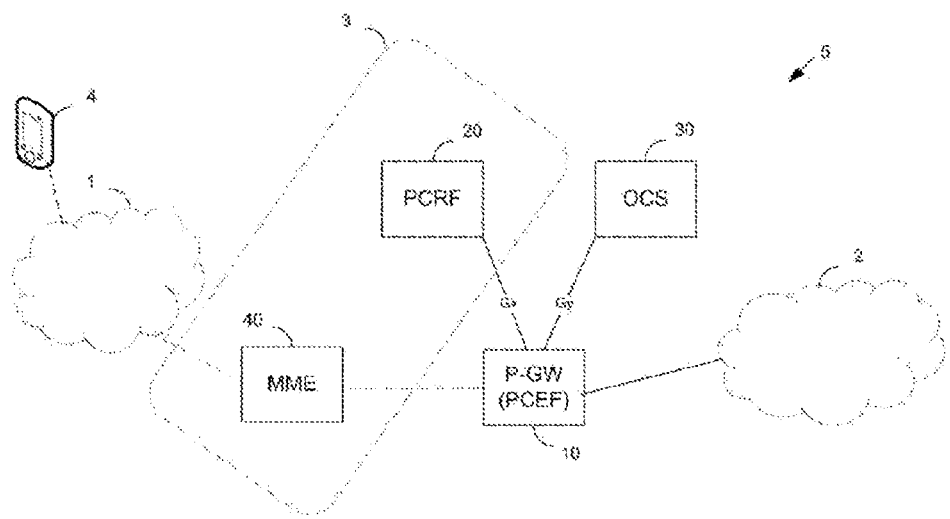
FIG. 1 shows a system for managing the network traffic related to a mechanism for reporting the presence of a terminal, according to a particular embodiment.

FIG. 1 shows a system 3 for managing the network traffic related to a mechanism for reporting the presence of a terminal 4 in a plurality of presence reporting areas of a communication network 5. This communications network 5 is, for example, an EPS (for "Evolved Packet System" in English) network. The terminal 4 accesses the communication network 5 via a mobile access network 1.

More particularly, the system 3 makes it possible to report a change of location, relative to a presence reporting area, of the terminal 4 for which a communication session is established with a packet communication network 2. The change of location corresponds to an entry or departure of the terminal 4 into or from a presence reporting area of a plurality of presence reporting areas associated with the terminal 4. Such a reporting area is typically a geographic area defined by one or more cells of the mobile access network 1.

The system 3 is integrated into a PCC architecture and comprises a control entity 20 and a mobility management entity 40. The control entity 20 is, for example, a PCRF entity, and the mobility management entity is an MME entity, as described in the specification document TS 23.203.

As described above, the control entity 20 collects information associated with the network, with a subscriber, or with an application. The control entity 20 adapts and controls the use of network resources on the basis of services required by the subscriber and his subscriber profile, and for this purpose it sends PCC control rules to a rules application entity 10. The latter entity is, for example, a PCEF entity, as described in the specification document TS 23.203. In the embodiment described, this PCEF entity is a module of a P-GW (for "Packet Data Network—Gateway" in English) interconnection gateway.

When a communication session is opened between the terminal 4 and the packet communication network 2, the control rules application entity 10 opens a control session with the control entity 20 so as to obtain the control rules to be applied to the communication session. The rules application entity 10 transmits the requested characteristics for the communication session to the control entity 20. On the basis of these characteristics and the information that it has collected as mentioned above, the control entity 20 determines the control rules (quality of service, charging, etc.) to be applied for the various services carried by the communication session, and sends them to the rules application entity 10. In particular, if the control entity 20 determines that the terminal 4 is, for example, associated with an offer of services associated with a location of the terminal 4 in one or more particular geographic areas, it sends to the rules application entity 10 a request for subscription to a mechanism for reporting the presence of the terminal 4 in the presence reporting areas corresponding to these geographic areas. The control entity 20 thus asks to be notified by the rules application entity 10 of changes in the location of the terminal 4 when the latter enters or departs from one of these presence reporting areas. Similarly, when the rules application entity 10 determines, on the basis of the control rules obtained from the control entity 20, that a session is to be opened with a credit management entity 30, the latter is also capable of subscribing to the presence reporting mechanism, so as to be notified by the rules application entity 10 of changes in the location of the terminal 4 when the latter enters or leaves a presence reporting area associated with the terminal 4.

The request for subscription to the presence reporting mechanism is then transmitted to the mobility management entity 40. The mobility management entity 40 is responsible for managing the mobility procedures in the communication network 5. Notably, it stores the request for subscription to the presence reporting mechanism and associates it with the communication session in a subscriber context related to the subscriber of the terminal 4. Whenever the terminal 4 enters or leaves one of the presence reporting areas associated with it, the mobility management entity 40 updates the location of the terminal 4 and updates the communication session. The rules application entity 10 is thus informed of the new location of the terminal 4, and in its turn it informs the entities of the communication network 5 that have subscribed to the mechanism for reporting the presence of the terminal 4. The rules application entity 10 is thus able to relay the information on the reporting of the presence of the terminal 4 to the control entity 20, or to the credit management entity 30.

Communication between the various entities is provided via interfaces defined by the 3GPP standardization group, notably the interface Gy between the rules application entity 10 and the credit management entity 30, and the interface Gx between the rules application entity 10 and the control entity 20.

The system 3 has been described in an EPC communication network, but it may easily be adapted to other network architectures.

Figure 2A:
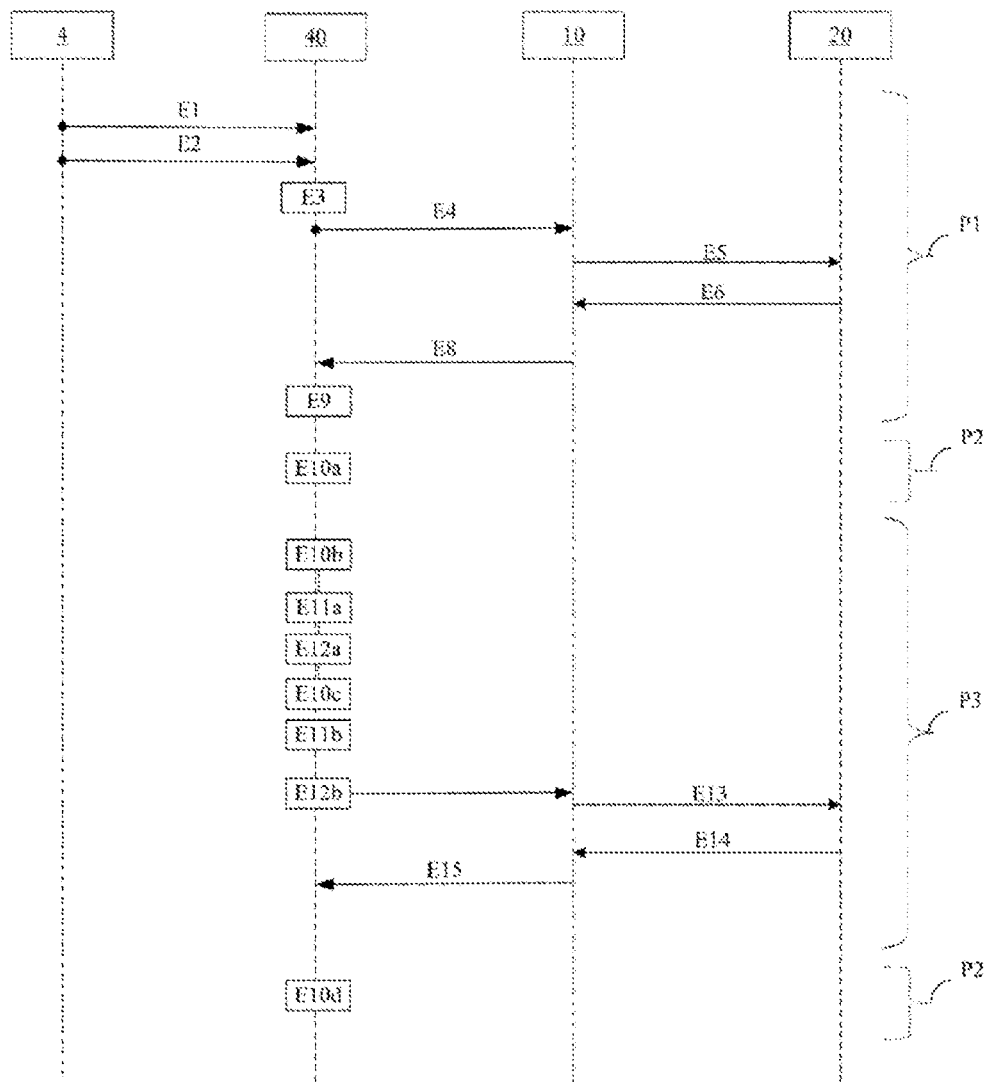
FIG. 2a shows the steps of a method for managing the network traffic related to a mechanism for reporting the presence of a terminal, according to a first particular embodiment.

FIG. 2a shows the steps of a method for managing the network traffic related to a mechanism for reporting the presence of a terminal 4 in a network, according to a first particular embodiment.

The management method is implemented by a mobility management entity 40. The mobility management entity 40 is, for example, an MME entity as described above.

More particularly, the method is implemented during different phases, P1, P2 and P3. Phase P1 is a phase of creating a communication session between the terminal 4 and a packet communication network (not shown). Phases P2 and P3 are, respectively, phases of normal load and overload of the mobility management entity 40. Phases P2 and P3 are repeated in a random order, on the basis of the state of the network traffic, for example.

Phase P1 comprises the steps E1 to E9. In a step E1, the terminal 4 sends a request to the mobility management entity 40 to be connected to the network. The terminal 4 then sends, in a step E2, a PDN (for "Packet Data Network") connectivity request to the mobility management entity 40. The purpose of this request is to establish a connection with a packet communication network (not shown in FIG. 2).

In a step E3, the mobility management entity 40 creates a subscriber context for the terminal 4. This subscriber context is used by the mobility management entity 40 in order to store various items of information related to the terminal 4 during the communication session that will be established subsequently. One subscriber context is associated for each terminal. The terminal 4 is, for example, identified by its IMSI (for "International Mobile Subscriber Identity") identifier.

In a step E4, the mobility management entity 40 relays the PDN connectivity request of the terminal 4, by transmitting a communication session creation request to a P-GW interconnection gateway 10. More precisely, the communication session is what is called an IP CAN (for "Internet Protocol Connectivity Access Network") session as defined by the 3GPP standardization group. This session represents an association between a terminal identified by an IPv4 (for "Internet Protocol version 4" in English) address or its IPv6 (for "Internet Protocol version 6" in English) prefix and a packet communication network identified by an APN (for "Access Point Name" in English) identifier.

In a step E5, the P-GW interconnection gateway 10 sends a CCR-I (for "Credit Control Request—Initial") message to a PCRF control entity 20, in order to obtain PCC control rules to be applied.

In a step E6, the PCRF control entity 20 responds to the P-GW interconnection gateway 10 by sending a CCA-I (for "Credit Control Answer—Initial") response message comprising the PCC control rules. These control rules comprise, in particular, a plurality of presence reporting area identifiers with which priority levels are associated. These identifiers tell the P-GW interconnection gateway 10 that presence reporting must be activated, or, in other words, that the PCRF control entity 20 wishes to be notified when the terminal enters or leaves one of the presence reporting areas associated with the subscriber. By way of example, this plurality is a list L0 of presence reporting areas with identifiers PRA1, PRA2, PRA3 and PRA4, with which priority levels p0, p1 and p2 are associated. For example, the list L0 takes the following form: {(PRA1, p0); (PRA2, p1); (PRA3, p2); (PRA4; p2)}, where the most important priority level is p0, followed, in decreasing order of priority, by priority level p1, then priority level p2. The area with the identifier PRA1 thus takes priority over the area with the identifier PRA2, which itself takes priority over the two areas with the identifiers PRA3 and PRA4. However, the last two areas have the same priority level.

In a step E8, the P-GW interconnection gateway 10 sends a response to the mobility management entity 40 to tell it that the IP CAN communication session is established. This response comprises the list L0 of the presence reporting areas associated with the terminal 4.

In a step E9, the mobility management entity 40 stores the list L0 in the subscriber context created for the terminal 4 in step E3, then subscribes to the presence reporting mechanism described in the 3GPP specification document TS 23.203, version 13.2, for each presence reporting area on the list L0. The subscriber context for the terminal 4 then comprises the list L0 of presence reporting areas and of the priority levels associated with them, together with an active or inactive status, indicating, for each of these areas, whether the presence reporting mechanism is active or suspended for the area concerned. This status is initially given the value "active", indicating that the reporting mechanism is activated for all the reporting areas. By way of example, the subscriber context stores this information in the form of a table T0 shown in FIG. 4a.

When the communication session has been established, the mobility management entity 40 verifies at regular intervals, in steps E10a-d, whether its processor load is higher than a predefined critical load threshold. To avoid complicating FIG. 2, only a few of these iterations are shown. However, there is no limit on the number of verifications implemented by the mobility management entity 40. For the present embodiment, it is assumed that the critical load is predefined at 90% occupation of the resources of the mobility management entity 40. In step E10a, the mobility management entity 40 measures a load rate of 70%, lower than the critical load. The mobility management entity 40 is therefore in a normal load phase P2, and no suspension of the presence reporting mechanism is implemented.

In step E10b, the mobility management entity 40 remeasures its processor load. The latter is then 95%, that is to say a rate higher than the critical load rate. The mobility management entity 40 is then in an overload phase P3.

Since the load rate is higher than the critical load rate, the mobility management entity 40 suspends, in a step E11a, the presence reporting mechanism for the presence reporting areas whose priority level is lower than or equal to a transitional priority level in a decreasing order of priority. By way of example, the transitional priority level is initially configured with the priority level p2. For this purpose, the mobility management entity 40 updates the subscriber context of the terminal 4. More precisely, the mobility management entity 40 assigns the value "inactive" to the statuses associated with the presence reporting areas whose priority is lower than or equal to the priority level p2, indicating that the reporting mechanism is suspended for these areas. In the example considered, only the areas with the identifiers PRA3 and PRA4 have a priority level lower than or equal to the priority level p2. The subscriber context shown in FIG. 4a is then updated according to FIG. 4b, in which the areas with the identifiers PRA3 and PRA4 are assigned an "inactive" status. Thus the latter areas are no longer subject to monitoring by the presence reporting mechanism.

In a step E12a, the mobility management entity 40 verifies, with the aid of a correspondence table storing for each priority level, whether sending a notification to the PCRF control entity 20 is desirable if the presence reporting mechanism is suspended. Such a correspondence table T1 is provided by way of example in relation to FIG. 5. The table T1 indicates that sending a notification to the PCRF control entity 20 is desirable for priority levels p0 and p1, but that it is not necessary for priority levels p2 and p3. The mobility management entity 40 combines the information provided by the correspondence table with the subscriber context of the terminal 4, in order to determine the presence reporting areas for which the PCRF control entity 20 must be notified. The subscriber context comprises two areas with an inactive status, namely the areas with the identifiers PRA3 and PRA4. The subscriber context also indicates that the areas with the identifiers PRA3 and PRA4 have a priority level of p2. The correspondence table T1 indicates, for priority level p2, that no notification to the PCRF control entity 20 is necessary, and therefore the mobility management entity 40 does not send it any notification.

In step E10c, the mobility management entity 40 verifies its load rate. By way of example, the load rate is 92%. Although suspending the reporting mechanism for the areas with the identifiers PRA3 and PRA4 has enabled the load on the mobility management entity 40 to be reduced, it still remains higher than the critical load. The mobility management entity 40 is therefore still in an overload phase P3. The mobility management entity 40 then increments the transitional priority level, giving it the priority level p1 which is immediately above it, after which it reiterates the suspension of the presence reporting mechanism in a step E11b, similar to step E11a. At the end of step E11a, the presence reporting areas of the subscriber context of the terminal 4 whose priority level is lower than or equal to the transitional priority level p1 have their status updated with the value "inactive". The presence reporting mechanism is thus suspended for all these areas. In the example described, these are the areas with the identifiers PRA2, PRA3 and PRA4. FIG. 4c shows the content of the subscriber context at the end of this step E11b.

In a step E12b, similar to step E12a, the mobility management entity 40 verifies, with the aid of a correspondence table T1, whether it is necessary to send a notification to the PCRF control entity 20 after the updating of the subscriber context of the terminal 4. The table T1 indicates that sending a notification to the PCRF control entity 20 is desirable for priority levels p0 and p1. At this stage, the subscriber context comprises three areas with an inactive status, namely the areas with the identifiers PRA2, PRA3 and PRA4. The subscriber context also indicates that the area with the identifier PRA2 has a priority level of p1, and that the areas with the identifiers PRA3 and PRA4 have a priority level of p2. The mobility management entity 40 therefore sends a notification to the PCRF control entity 20 to notify the latter that the presence reporting mechanism has been suspended for the reporting area with the identifier PRA2. More precisely, the mobility management entity 40 sends to the P-GW interconnection gateway 10 a communication session update message comprising an item of information indicating that the presence reporting mechanism is suspended for the area with the identifier PRA2. The P-GW interconnection gateway 10 then translates and relays this message in a step E13 to the PCRF control entity 20. The latter message is, for example, a CCR update message.

In a step E14, the PCRF control entity 20 acknowledges the CCR message by sending a CCA response to the P-GW interconnection gateway 10. In a step E15, the latter acknowledgement message is then relayed by the P-GW interconnection gateway 10 to the mobility management entity 40.

In step E10d, the mobility management entity re-measures its load rate. By way of example, the latter is 80%. Suspending the presence reporting mechanism for the areas with the identifiers PRA2, PRA3 and PRA4 has thus made it possible to return to a load rate lower than the critical load rate. The mobility management entity is then again in a normal load phase P2.

It is also emphasized that, although it is not shown, the presence reporting mechanism is reactivated for the presence reporting areas having an inactive status in the subscriber context, on the basis of the priority levels according to an increasing order of the levels. More precisely, the reporting mechanism is reactivated for the presence reporting areas linked to a priority level, whenever the load on the mobility management entity 40 reaches a reactivation threshold for this priority level.

In the embodiment described, the verification of the load on the mobility management entity in steps E10a-d uses a processor load rate. However, there is no limit on the type of indicator used to carry out this verification. In another embodiment, the method uses, for example, a measurement of the number of requests received by the mobility management entity 40, a rate of occupation of its queues, or more generally any indicator allowing an activity of the mobility management entity 40 to be monitored.

In another embodiment, the correspondence table between the priority levels and the need to notify the PCRF control entity 20 is supplied by the latter entity. This embodiment makes it possible, notably, to take into account the priorities associated with presence reporting areas for a terminal.

The present embodiment has been described for a single terminal, but there is no limit on the number of terminals managed by the mobility management entity. In another embodiment, for a given priority level, the mobility management entity suspends the presence reporting mechanism simultaneously for all the terminals that it manages.

Additionally, if the terminal 4 moves from a geographic area covered by the mobility management entity 40 to a geographic area covered by another mobility management entity, the method comprises sending the subscriber context, with the priority levels of the presence reporting areas associated with the terminal 4, to this other mobility management entity.

The present embodiment has been described with an implementation in an LTE/EPS network. However, the method may easily be adapted to other network technologies. In a GPRS (for "General Packet Radio Service"), EDGE (for "Enhanced Data Rates for GSM Evolution") or UMTS (for "Universal Mobile Telecommunications System") network, the method will, for example, be implemented by an SGSN entity.

Figure 2B:
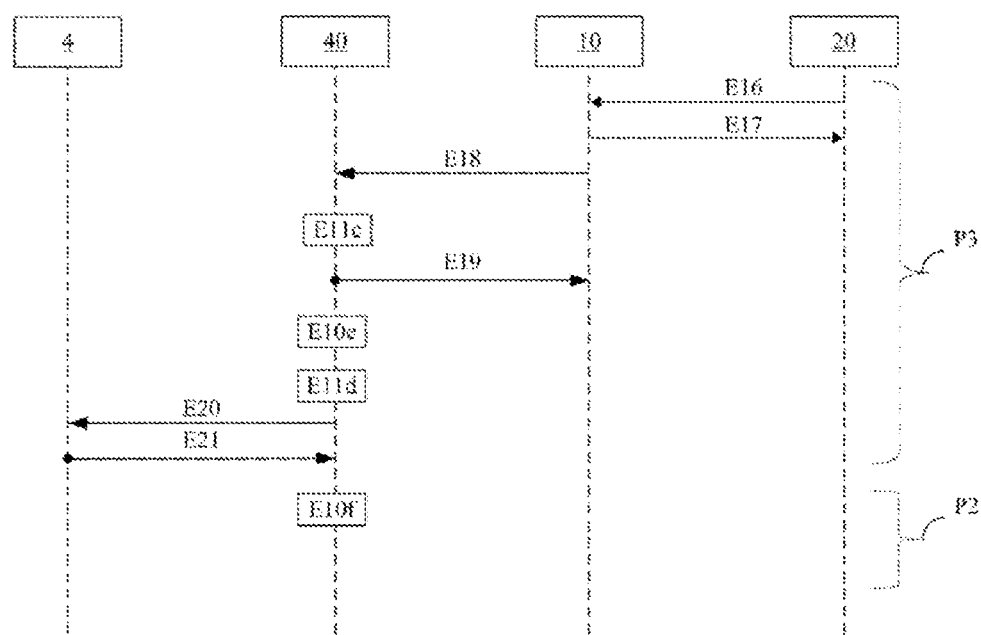
FIG. 2b shows the steps of a method for managing the network traffic related to a mechanism for reporting the presence of a terminal, according to a second particular embodiment.

FIG. 2b shows the steps of a method for managing the network traffic related to a mechanism for reporting the presence of a terminal 4 in a network, according to a second particular embodiment.

The network entities implemented in this second embodiment are the same as those described in relation to FIG. 2a. This second embodiment describes, more particularly, the steps of the management method implemented during an update of the priority levels or of the list of the presence reporting areas associated with a subscriber. It also describes the particular case where the presence reporting mechanism is suspended for all the presence reporting areas associated with a subscriber.

It is assumed that the mobility management entity is in an overload phase P3. It is also assumed that a communication session is established between the terminal 4 and a packet communication network, the subscriber context for the terminal 4 corresponding to the subscriber context of FIG. 4c. The mobility management entity 40 also has the same correspondence table T1 as that described above in relation to FIG. 5. The critical load rate and the transitional priority level are those corresponding to the configuration of the mobility management entity 40 at the end of the process described in relation to FIG. 2a, that is to say 90% and p1 respectively.

In a step E16, the PCRF control entity 20 transmits to the P-GW interconnection gateway 10 a "Re-authorization Request" message comprising a new list L1 of presence reporting area identifiers PRA1, PRA2, PRA5 and PRA6, with which priority levels p0 and p1 are associated. The list L1 is, by way of example, as follows: {(PRA1, p0); (PRA2, p1); (PRA5, p0); (PRA6; p1)}, where the areas with the identifiers PRA1 and PRA5 have a priority level of p0, and priority areas with the identifiers PRA2 and PRA6 have a priority level of p1.

In a step E17, the P-GW interconnection gateway 10 acknowledges the message received in step E16.

In a step E18, the P-GW interconnection gateway 10 sends a communication session update message to the mobility management entity 40. This message comprises the list L1.

In a step E11c, the mobility management entity 40 updates the subscriber context of the terminal 4. For this purpose, the mobility management entity 40 assigns an "inactive" status to all the new presence reporting areas of the subscriber context of the terminal 4 whose priority level is lower than or equal to the transitional priority level p1, and an "active" status for the presence reporting areas of the subscriber context of the terminal 4 whose priority level is higher than the transitional priority level p1. The presence reporting mechanism is then suspended for the areas with the identifiers PRA2 and PRA6. FIG. 4d shows the content of the subscriber context at the end of step E11c.

In a step E19, the mobility management entity 40 acknowledges the communication session update message to the P-GW interconnection gateway 10. The acknowledgement message sent by the mobility management entity 40 further comprises a notification to be sent to the PCRF control entity 20 to notify the latter that the presence reporting mechanism has been suspended for the reporting area with the identifier PRA6. More precisely, the mobility management entity 40 sends to the P-GW interconnection gateway 10 a communication session update message comprising an item of information indicating that the presence reporting mechanism is suspended for the area with the identifier PRA6. The P-GW interconnection gateway 10 then translates and relays this message in a step to the PCRF control entity 20. However, no notification is sent for the presence reporting areas whose status in the subscriber context of the terminal 4 is an inactive status both before and after the update of the context in step E11c (as in the case of the reporting area with the identifier PRA2).

In a step E10e, the mobility management entity 40 verifies its load rate. By way of example, the load rate is 91%. The mobility management entity 40 is therefore still in an overload phase P3. The mobility management entity 40 then increments the transitional priority level, giving it the priority level p0 which is immediately above the priority level p1, after which it reiterates the suspension of the presence reporting mechanism in a step E11d, similar to step E11c. At the end of step E11d, the presence reporting areas of the subscriber context of the terminal 4 whose priority level is lower than or equal to the transitional priority level p0 have their status updated with the value "inactive". The presence reporting mechanism is thus suspended for all the areas associated with the terminal 4. FIG. 4e shows the content of the subscriber context at the end of step E11d.

Since the reporting areas for which the presence reporting mechanism has been suspended have either a priority level of p0 or a priority level of p1, a new notification, indicating that the presence reporting mechanism has been suspended for the areas with the identifiers PRA1 and PRA5, is sent to the PCRF control entity 20 according to the correspondence table T1 (not shown).

Since the reporting mechanism is suspended for all the presence reporting areas associated with the terminal 4, the mobility management entity 40 sends, in a step E20, a command to the base station to which the terminal is attached to cancel the subscription of the base station to the presence reporting mechanism.

In a step E21, the base station acknowledges the subscription cancelation command received in E20 to the mobility management entity 40.

In a step E10f, the mobility management entity 40 verifies its load rate. By way of example, the latter is 75%. The load on the mobility management entity 40 has fallen back below the critical load, and the mobility management entity 40 is again in a normal load phase P2. Thus the cancelation of the subscription to the reporting mechanism by the base station has made it possible to reduce the traffic to the mobility management entity 40. This reduction of the incoming traffic is added to the action already taken locally by the mobility management entity 40, and enables the latter to return to a normal load rate.

Figure 3:
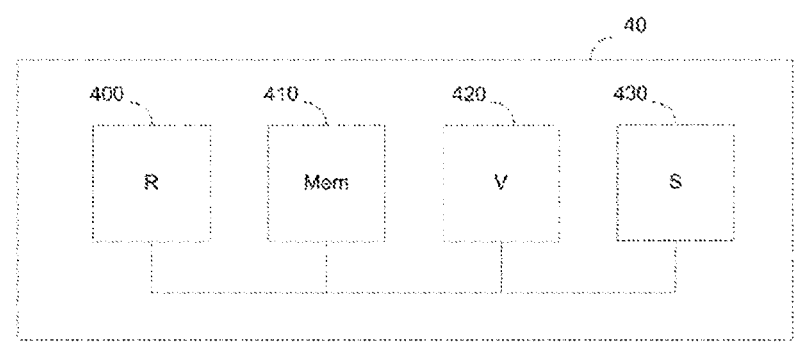
FIG. 3 shows a mobility management entity according to a particular embodiment.

FIG. 3 shows a mobility management entity 40 according to a particular embodiment. The mobility management entity 40 is capable of implementing a mechanism for reporting the presence of a terminal in a plurality of presence reporting areas, and comprises:
   a receiving module 400 arranged to receive from a control entity, for each presence reporting area of said plurality, an area identifier and a priority level for this area;
   a storage module 410 arranged to store, in a subscriber context related to a subscriber of the terminal, the identifiers and priority levels received in association with an identifier of the terminal;

a verification module 420 arranged to verify that the load on the mobility management entity 40 is higher than a predefined critical load threshold;

a suspension module 430, activated when the load on the mobility management entity 40 is verified to be higher than a predefined critical load threshold, and arranged to suspend the presence reporting mechanism for the presence reporting areas, referred to as non-monitored areas, of the plurality whose priority level is lower than a transitional priority level.

In another embodiment, the mobility management entity 40 further comprises a sending module arranged so that, when the presence reporting mechanism is suspended for all the presence reporting areas associated with the terminal, a command is sent to the base station to which the terminal is attached to cancel the subscription of the base station to the presence reporting mechanism for the terminal.

In another embodiment, the mobility management entity 40 comprises a notification module arranged to notify a control entity if the reporting mechanism is suspended for one of the presence reporting areas associated with the terminal.

The invention is implemented by means of software and/or hardware components. In this context, the term "module" may equally well refer, in this document, to a software component, a hardware component, or a set of hardware and/or software components, able to perform a function or a set of functions, as described above for the module in question.

A software component corresponds to one or more computer programs, one or more sub-programs of a program, or more generally any element of a program or a software package. Such a software component is stored in memory and is then loaded and executed by a data processor of a physical entity, and can access the hardware resources of this physical entity (memory devices, recording media, communications buses, input/output circuit cards, user interfaces, etc.).

Similarly, a hardware component corresponds to any element of a hardware assembly. It may be a hardware component, whether programmable or non-programmable, with or without an integrated processor for executing software. For example, it may be an integrated circuit, a chip card, a circuit card for executing microsoftware (firmware), etc.

In a particular embodiment, the modules 400, 410, 420, 430 are arranged to execute the method for managing network traffic related to a mechanism for reporting the presence of a terminal as described above. They are preferably software modules comprising software instructions for the execution of the steps of the method for managing network traffic related to a mechanism for reporting the presence of a terminal as described above, implemented by a mobility management entity 40.

The invention therefore also concerns:

a program for a mobility management entity, comprising program code instructions intended to command the execution of the steps of the method for managing network traffic related to a mechanism for reporting the presence of a terminal as described above, when said program is executed by said mobility management entity;

a recording medium, readable by a mobility management entity, on which the program for a mobility management entity is recorded.

The software modules may be stored in, or transmitted by, a data medium. This medium may be a hardware storage medium, for example a CD-ROM, a magnetic disk or a hard disk, or a transmission medium such as an electrical, optical or radio signal, or a telecommunications network.

Although the present disclosure has been described with reference to one or more examples, workers skilled in the art will recognize that changes may be made in form and detail without departing from the scope of the disclosure and/or the appended claims.

The invention claimed is:

1. A method for managing, in a communication network, network traffic related to a mechanism for reporting presence of a terminal in a plurality of presence reporting areas, each presence reporting area comprising one or more geographic areas, comprising the following acts implemented by a mobility management entity:

receiving, for each presence reporting area of said plurality, an area identifier and a priority level for said area;

storing, in a subscriber context related to a subscriber of said terminal, said identifiers and priority levels received in association with an identifier of said terminal;

verifying whether a load on said mobility management entity, generated by receiving presence reporting messages, is higher than a predefined critical load threshold; and in response to the load on said mobility management entity being verified to be higher than the predefined critical load threshold:

suspending said presence reporting mechanism for the presence reporting areas, referred to as non-monitored areas, of said plurality whose priority level is lower than a transitional priority level.

2. The method as claimed in claim 1, wherein the suspending act is reiterated until the load on said mobility management entity is below said critical load threshold, said transitional priority level being incremented on each new iteration to the priority level lying immediately above it.

3. The method as claimed in claim 1, further comprising, when said presence reporting mechanism is suspended for all the presence reporting areas associated with said terminal, sending to a base station to which said terminal is attached a command to cancel a subscription of said base station to said presence reporting mechanism for said terminal.

4. The method as claimed in claim 1, wherein a notification indicator is associated with each priority level, said indicator indicating whether it is desired to send a notification to a control entity for said priority level if the reporting mechanism is suspended, comprising sending to said control entity a notification of suspension of said presence reporting mechanism for said non-monitored areas having a priority level for which said indicator indicates that said sending is desired.

5. The method as claimed in claim 4, wherein said notification indicator and said priority levels are supplied to said mobility management entity by said control entity.

6. The method as claimed in claim 1, wherein said subscriber context comprises, for each presence reporting area identifier of said stored plurality, an active or suspended status, indicating whether the presence reporting mechanism is active or suspended for said presence reporting area, said method further comprising updating said statuses if the presence reporting areas associated with said terminal are modified, the statuses associated with the new presence reporting areas being active for said new presence reporting areas whose priority level is higher than said transitional priority level, and inactive for said new presence reporting areas whose priority level is lower than said transitional priority level.

7. A mobility management entity, in a communication network, capable of implementing a mechanism for reporting the presence of a terminal in a plurality of presence reporting areas, each presence reporting area comprising one or more geographic areas, comprising:
a processor;
a non-transitory computer-readable medium comprising instructions stored thereon, which when executed by the processor configure the mobility management entity to perform acts comprising:
receiving from a control entity, for each presence reporting area of said plurality, an area identifier and a priority level for said area;
storing, in a subscriber context related to a subscriber of said terminal, said identifiers and priority levels received in association with an identifier of said terminal;
verifying that a load on said mobility management entity, generated by receiving presence reporting messages, is higher than a predefined critical load threshold;
in response to the load on said mobility management entity being verified to be higher than the predefined critical load threshold, suspending said presence reporting mechanism for the presence reporting areas, referred to as non-monitored areas, of said plurality whose priority level is lower than a transitional priority level.

8. A system for managing network traffic related to a mechanism for reporting the presence of a terminal in a plurality of presence reporting areas of a communication network, comprising:
at least one mobility management entity, each comprising:
a first processor;
a first non-transitory computer-readable medium comprising instructions stored thereon, which when executed by the first processor configure the mobility management entity to perform acts comprising:
receiving from a control entity, for each presence reporting area of said plurality, an area identifier and a priority level for said area;
storing, in a subscriber context related to a subscriber of said terminal, said identifiers and priority levels received in association with an identifier of said terminal;
verifying that a load on said mobility management entity, generated by receiving presence reporting messages, is higher than a predefined critical load threshold;
in response to the load on said mobility management entity being verified to be higher than the predefined critical load threshold, suspending said presence reporting mechanism for the presence reporting areas, referred to as non-monitored areas, of said plurality whose priority level is lower than a transitional priority level; and
at least one control entity, including the control entity from which the area identifier and priority level is received, each control entity comprising:
a second processor;
a second non-transitory computer-readable medium comprising instructions stored thereon, which when executed by the second processor configure the control entity to perform acts comprising:
determining that a reporting of presence of a terminal in a plurality of presence reporting areas is required for a subscriber profile of said network; and
sending to a mobility management entity of the at least one mobility management entity, for each presence reporting area of said plurality, an area identifier and a priority level for said area.

9. A non-transitory computer-readable medium comprising program code instructions recorded thereon, which when executed by a processor of a mobility management entity, configure the mobility management entity to perform acts comprising:
managing, in a communication network, network traffic related to a mechanism for reporting presence of a terminal in a plurality of presence reporting areas, each presence reporting area comprising one or more geographic areas, comprising:
receiving, for each presence reporting area of said plurality, an area identifier and a priority level for said area;
storing, in a subscriber context related to a subscriber of said terminal, said identifiers and priority levels received in association with an identifier of said terminal;
verifying whether a load on said mobility management entity, generated by receiving presence reporting messages, is higher than a predefined critical load threshold; and
in response to the load on said mobility management entity being verified to be higher than the predefined critical load threshold:
suspending said presence reporting mechanism for the presence reporting areas, referred to as non-monitored areas, of said plurality whose priority level is lower than a transitional priority level.

* * * * *